United States Patent
Singh et al.

(10) Patent No.: US 10,677,016 B2
(45) Date of Patent: Jun. 9, 2020

(54) METHODS FOR REDUCING FLUID COMMUNICATION BETWEEN WELLS

(71) Applicant: Halliburton Energy Services, Inc., Houston, TX (US)

(72) Inventors: Dipti Singh, Kingwood, TX (US); Ubong Inyang, Humble, TX (US); Golchehreh Salamat, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/311,140

(22) PCT Filed: Jul. 13, 2016

(86) PCT No.: PCT/US2016/041982
§ 371 (c)(1),
(2) Date: Dec. 18, 2018

(87) PCT Pub. No.: WO2018/013096
PCT Pub. Date: Jan. 18, 2018

(65) Prior Publication Data
US 2019/0195043 A1    Jun. 27, 2019

(51) Int. Cl.
*E21B 33/138*    (2006.01)
*E21B 43/26*    (2006.01)
*C09K 8/514*    (2006.01)
*C09K 8/504*    (2006.01)
*E21B 33/13*    (2006.01)

(52) U.S. Cl.
CPC .......... *E21B 33/138* (2013.01); *C09K 8/5045* (2013.01); *C09K 8/514* (2013.01); *E21B 33/13* (2013.01); *E21B 43/26* (2013.01)

(58) Field of Classification Search
None
See application file for complete search history.

(56) References Cited

U.S. PATENT DOCUMENTS

| | | | |
|---|---|---|---|
| 4,749,038 A * | 6/1988 | Shelley | E21B 49/008 166/250.1 |
| 5,836,392 A | 11/1998 | Urlwin-Smith | |
| 6,192,986 B1 | 2/2001 | Urlwin-Smith | |
| 6,196,317 B1 | 3/2001 | Hardy | |

(Continued)

OTHER PUBLICATIONS

Patent Cooperation Treaty, International Search Report and Written Opinion, PCT Appln. No. PCT/US2016/041982, dated Apr. 11, 2017.

*Primary Examiner* — Anuradha Ahuja
(74) *Attorney, Agent, or Firm* — McGuireWoods, LLP (57) ABSTRACT

Methods and systems for reducing fluid communication between wells. Providing a first treatment fluid comprising synthetic clay and an aqueous carrier fluid; pumping the first treatment fluid into a first fracture network in fluid communication with a first well; placing the synthetic clay in the first fracture network; pumping a second treatment fluid into the first fracture network after placing the synthetic clay in the first fracture network; wherein the second treatment fluid is not produced in a second well in fluid communication with a second fracture network, and wherein the second fracture network is in fluid communication with the first fracture network.

10 Claims, 5 Drawing Sheets

(56) References Cited

U.S. PATENT DOCUMENTS

| | | |
|---|---|---|
| 7,458,424 B2 | 12/2008 | Odeh et al. |
| 8,343,896 B2 | 1/2013 | Eoff et al. |
| 8,459,352 B1 | 6/2013 | Kalman et al. |
| 8,522,874 B2 | 9/2013 | Reddy et al. |
| 8,684,081 B2 | 4/2014 | Al-Mutairi et al. |
| 8,703,659 B2 | 4/2014 | Dalrymple et al. |
| 8,985,212 B1 | 3/2015 | Crespo et al. |
| 2003/0213593 A1 | 11/2003 | Bouwmeester et al. |
| 2010/0282466 A1 | 11/2010 | Brennis et al. |
| 2011/0048708 A1 | 3/2011 | Glasbergen et al. |
| 2011/0114318 A1* | 5/2011 | Ezell .................... C09K 8/5045 166/305.1 |
| 2011/0265994 A1 | 11/2011 | Entchev |
| 2011/0320128 A1* | 12/2011 | Shook .................. E21B 43/162 702/13 |
| 2013/0048282 A1 | 2/2013 | Adams et al. |
| 2014/0174739 A1 | 6/2014 | Bourcier et al. |

\* cited by examiner

METHODS FOR REDUCING FLUID COMMUNICATION BETWEEN WELLS

TECHNICAL FIELD

The present disclosure relates to the use of treatment fluids for reducing fluid communication between wells and more particularly to the use of synthetic clay to reduce or prevent fluid communication between one or more wells.

BACKGROUND

Stimulation techniques may be used to increase the amount of hydrocarbons obtained from a subterranean formation. For example, some unconventional subterranean formations may be fractured to improve well productivity by placing or enhancing fractures which run from a wellbore into a surrounding subterranean formation. Other methods of increasing productivity include drilling additional wells in the subterranean formation. In some instances, a new well may be drilled between other existing wells and may reduce the well spacing of the field. In other cases, field development may be planned such that multiple wells may be placed in close proximity to accelerate recovery.

When wells are placed sufficiently close together, stimulation of one well may impact production of other wells if fluid communication between the wells is present. This may be referred to generally as "well bashing," and this loss of production occurs because the stimulated well is in fluid communication with one or more of the producing wells and the treatment fluids used in the stimulated well may enter the other wells through connecting flow paths in the fracture networks within the subterranean formation. When two wells are in fluid communication, stimulation treatment fluids may be lost through flow into the non-stimulated well. If this occurs, the stimulation operation may require more stimulation treatment fluids than would be necessary if there was no fluid communication with other wells. This may result in increases in operation time and expenditure. Further, if the non-stimulated well is producing, well production may be reduced or lost due to the inflow of the stimulation treatment fluids into the producing well. In situations in which fluid communication is established between multiple producing wells the fluid used to displace the hydrocarbons may take the path of least flow resistance and may bypass reserves in low permeability areas and instead flow into another producing well leading to a loss in production in both producing wells.

Some methods used to reduce or prevent fluid communication between wells may involve the use of polymer solutions. The polymer solutions may be introduced into the flow paths between wells, and then the polymers may be cross-linked to reduce or prevent flow between the wells by blocking the flow paths between the wells. However, the polymers in the solution may hydrolyze over time and lose viscosity. As such, the polymers may only provide a temporary solution. Because of this degradation, the polymer solutions may need to be used every time a well stimulation is performed. They may also need to be used as a remedial measure in producing wells if fluid communication between producing wells occurs because the previously introduced polymers have degraded. Further, the polymers may not be thermally stable in high temperature environments, which are generally environments with temperatures greater than 200° F. The thermal degradation of the polymers may preclude use in high temperature environments, and the polymers may not be sufficient for reducing or preventing fluid communication in wells in high temperature subterranean formations or when operations requiring elevated temperatures need to be performed. When the polymers degrade, they may lose viscosity and become easier to displace when contacted by subsequent fluids such as stimulation treatment fluids or fluids used to displace hydrocarbons. As such, the polymer solutions may not provide a long-term solution to prevent well bashing and may not be stable in high temperature subterranean formations.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates to the use of treatment fluids for reducing fluid communication between wells and more particularly to the use of synthetic clay to reduce or prevent fluid communication between one or more wells.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Examples of the methods described herein comprise the use of synthetic clay in a treatment fluid comprising an aqueous carrier fluid. The synthetic clay may be used in various types of treatment fluids, for example, a pre-pad fluid, a pad fluid, a proppant fluid, flush fluid or as a remedial fluid. The synthetic clay may be introduced into a flow path in a subterranean formation which allows fluid communication between at least two wells. For example, the synthetic clay may be introduced into a fracture network and then placed into the far field region of the fracture network where a flow path between two fracture networks and consequently two wells may exist. When placed into the flow path, the synthetic clay may swell and increase in viscosity. The synthetic clay may then reduce or prevent flow through the flow path. As such, fluid communication between the wells may be reduced or completely blocked. The synthetic clay may reside in the flow path while at least one of the wells is producing. The synthetic clay may prevent fluid inflow into the producing well from other wells throughout production of the producing well.

In the examples described herein, the synthetic clay may comprise a clay produced synthetically or a natural clay which has been modified, for example, through chemical or physical modification. Examples of modification may include sieving, grinding, purification, or chemical modification. Examples of the synthetic clay may include synthetic hectorite clays and synthetic smectite clays. Examples of synthetic hectorite clays include, but are not limited to, a synthetic hectorite clay having a composition by weight on a dry basis of 59.5% $SiO_2$, 27.5% MgO, 0.8% $Li_2O$ and 2.8% $Na_2O$, a synthetic hectorite clay having a composition by weight on a dry basis of 54.5% $SiO_2$, 26.0% MgO, 0.8% $Li_2O$, 5.6% $Na_2O$ and a 4.1% $P_2O_5$ and synthetic hectorite clay having a composition by weight on a dry basis of 54.5% $SiO_2$, 26.0% MgO, 0.8% $LiO_2$, 5.6% $Na_2O$, 4.1% $P_2O_5$, and so on. A commercial example of a synthetic hectorite clay is THERMA-VIS™, available from Halliburton Energy Services, Inc. of Houston, Tex. THERMA-VIS is a trademark of Halliburton Energy Services, Inc. A commercial example of a synthetic smectite clay is LAPONITE®, available from BYK-Gardner GmbH of Geretsried, Germany. LAPONITE is a registered trademark of BYK-Gardner GmbH. In some examples the synthetic clay will not comprise or consist of a kaolin clay (e.g., kaolinite, dickite, halloysite, and nacrite), a illite clay, a chlorite clay, a sepiolite clay, or an attapulgite clay. The synthetic clay may form nanolayers less than 100 nm in thickness when hydrated. The synthetic clay may swell when contacted with an aqueous fluid. The synthetic clay is shear-thinning and self-viscosifying. Shear-thinning describes a non-Newtonian fluid which has a decreased viscosity when subjected to shear strain. Self-viscosifying describes a fluid which increases in viscosity in the absence of shear strain and which is able to do so without the need of gelling agents or other viscosifying additives. Because the synthetic clay is shear-thinning, the synthetic clay may be used in stimulation treatment fluids which have very low viscosities, for example, pad fluids when sufficient shear strain is present. The synthetic clay may be thermally stable at temperatures greater than 200° F. For example, the synthetic clay may be thermally stable at temperatures of 250° F., 300° F., 350° F., 400° F., 450° F., 500° F., or greater. As such, the synthetic clay may be placed into flow paths and/or fracture networks with temperatures of 350° F., 400° F., 450° F., 500° F., or greater. "Thermal stability," as used herein, refers to the absence of material degradation of the synthetic clay at a specific temperature such that the synthetic clay can no longer provide its intended functionality, for example, reducing fluid flow through a flow path. Material degradation of the synthetic clay is degradation of the synthetic clay to form one or more different materials which are products of degraded synthetic clay and not synthetic clay itself.

In some examples, the synthetic clay may not hydrolyze. The synthetic clay may swell in the absence of shear and in the presence of an aqueous fluid. Under such conditions, the synthetic clay may swell to several times its volume relative to the same amount of synthetic clay unexposed to aqueous fluids. Compared to other clays such as kaolin or bentonite, the synthetic clay may swell to a greater degree and possess a greater viscosity. The synthetic clay may be used in an aqueous carrier fluid. The concentration of the synthetic clay in the treatment fluid may range from about 0.01% (w/v) of the treatment fluid to about 20% (w/v) of the treatment fluid. The concentration of the synthetic clay in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the synthetic clay in the treatment fluid may be about 0.01% (w/v) of the treatment fluid, about 1% (w/v) of the treatment fluid, about 5% (w/v) of the treatment fluid, about 10% (w/v) of the treatment fluid, or about 20% (w/v) of the treatment fluid. With the benefit of this disclosure, one of ordinary skill in the art will be able to obtain and prepare a treatment fluid comprising synthetic clay for a given application.

In the various examples, the treatment fluids comprise an aqueous carrier fluid used to transport the synthetic clay into the subterranean formation from the wellbore. The aqueous carrier fluid may generally be from any source. In various examples, the aqueous carrier fluid may comprise fresh water, salt water, seawater, brine, or an aqueous salt solution. In some embodiments, the aqueous carrier fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like. If brines are used, the salinity of the brine should not be so great as to negatively impact the ability of the synthetic clay to swell.

Gelling agents comprising various species of celluloses and their derivatives may be optionally added to the same treatment fluid comprising the synthetic clay or to other treatment fluids used in the example methods. The gelling agents may increase the viscosity of the synthetic clay. Examples of the gelling agents may include, but are not limited to, carboxyethyl cellulose, carboxymethyl cellulose, carboxymethylhydroxyethyl cellulose, hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose, guar, guar derivatives, xanthum, or combinations thereof. In a specific example, the gelling agent is an anionic gelling agent. It is to be understood that the gelling agents are optional and may only be used in some examples. The concentration of the gelling agent in the treatment fluid may range from about 0.1% (w/v) to about 3% (w/v) of the treatment fluid. The concentration of the gelling agent in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the gelling agent in the treatment fluid may be about 0.1% (w/v) of the treatment fluid, about 0.5% (w/v) of the treatment fluid, about 1% (w/v) of the treatment fluid, about 2.4% (w/v) of the treatment fluid, or about 3% (w/v) of the treatment fluid. With the benefit of this disclosure, one of ordinary skill in the art will be able to obtain and prepare a treatment fluid comprising a gelling agent for a given application.

Crosslinking agents may be optionally added to the same treatment fluid comprising the optional gelling agent. The crosslinkers may crosslink the gelling agent. The term "crosslinking agent" is defined herein to include any molecule, atom, or ion that is capable of forming one or more crosslinks between molecules of the gelling agent or between one or more atoms in a single molecule of the gelling agent.

The crosslinking agent may comprise a metal ion that is capable of crosslinking the gelling agent. Examples of suitable crosslinking agents include, but are not limited to, borate ions and zirconium ions. These ions may be provided by providing any compound that is capable of producing one or more of these ions. Examples of such compounds include, but are not limited to, boric acid, disodium octaborate tetrahydrate, sodium diborate, pentaborates, ulexite, colemanite, zirconium oxychloride, chelates of zirconium, derivatives thereof, and combinations thereof. Suitable crosslinking agents also include titanium based compounds such as titanium oxychloride or organic titanates, such as titanium chloride and triethyl amine complexes, and aluminium based compounds, such as aluminium acetate, organo aluminium complexes, and the like. It is to be understood that the gelling agents are optional and may only be used in some examples. The concentration of the crosslinking agent in the treatment fluid may range from about 0.001% (w/v) of the treatment fluid to about 1% (w/v) of the treatment fluid. The concentration of the crosslinking agent in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the crosslinking agent in the treatment fluid may be about 0.001% (w/v) of the treatment fluid, about 0.01% (w/v) of the treatment fluid, about 0.1% (w/v) of the treatment fluid, about 0.5% (w/v) of the treatment fluid, or about 1% (w/v) of the treatment fluid. With the benefit of this disclosure, one of ordinary skill in the art will be able to obtain and prepare a treatment fluid comprising a crosslinking agent for a given application.

The synthetic clay may be used in various types of treatment fluids, for example, a pre-pad fluid, a pad fluid, a proppant fluid, a remedial fluid, and the like. For example, if the treatment fluid is a pre-pad fluid comprising the synthetic clay, the pre-pad fluid may be injected into a fracture network. A subsequent pad fluid which may or may not contain additional synthetic clay may be injected into the same fracture network at a pressure above the fracture gradient of the subterranean formation to displace the synthetic clay into the far field region of the fracture network where flow paths between other wells may be present. The far field region is the region of the fracture network which is farthest from the wellbore. If the synthetic clay is used in a pad fluid, the pad fluid may be injected into the fracture network at a pressure above the fracture gradient of the subterranean formation to create or enhance one or more fractures within the fracture network and the synthetic clay may be deposited in the fracture network during this process. If the synthetic clay is used in a proppant fluid, the proppant fluid will be injected into the fracture network to prop the fractures within the fracture network. As discussed above, the synthetic clay may form nanolayers when hydrated and may be of a sufficiently small size to enter the smaller fractures of a fracture network which may branch from a primary fracture. These branching fractures may be referred to as secondary fractures, tertiary fractures, etc. dependent upon the degree of branching. In some examples, the synthetic clay may also aid in suspension of the proppant when shear strain is sufficiently low to allow the synthetic clay to develop enough viscosity to gel and support a particular proppant. In this specific example, the synthetic clay may be placed into the fracture network along with the proppant. If the treatment fluid is used in a remedial operation, the treatment fluid comprising the synthetic clay may be introduced into the fracture network at a sufficient pressure to pump it into the far field region of the fracture network where flow paths between other wells may be present. When the synthetic clay has been placed, the synthetic clay may increase in viscosity and swell to a size sufficient for reducing or preventing flow in the flow paths between the fracture networks and corresponding wells.

It is to be understood that the synthetic clay is to be placed into the areas of the fracture network where flow paths in fluid communication with other wells may occur. As such, a pumping pressure which is sufficiently high enough for placing the synthetic clay into these flow paths may be used in some examples to place the synthetic clay into the fracture network as desired. If a lower pressure is used, the synthetic clay may bridge fractures in the near wellbore region or block formation pores which may inhibit stimulation and production of the well. As discussed above, the synthetic clay is thermally stable at temperatures up to and greater than 500° F., and may be placed in the flow path to reduce or prevent fluid communication in a flow path for as long as desired.

Figure 1:
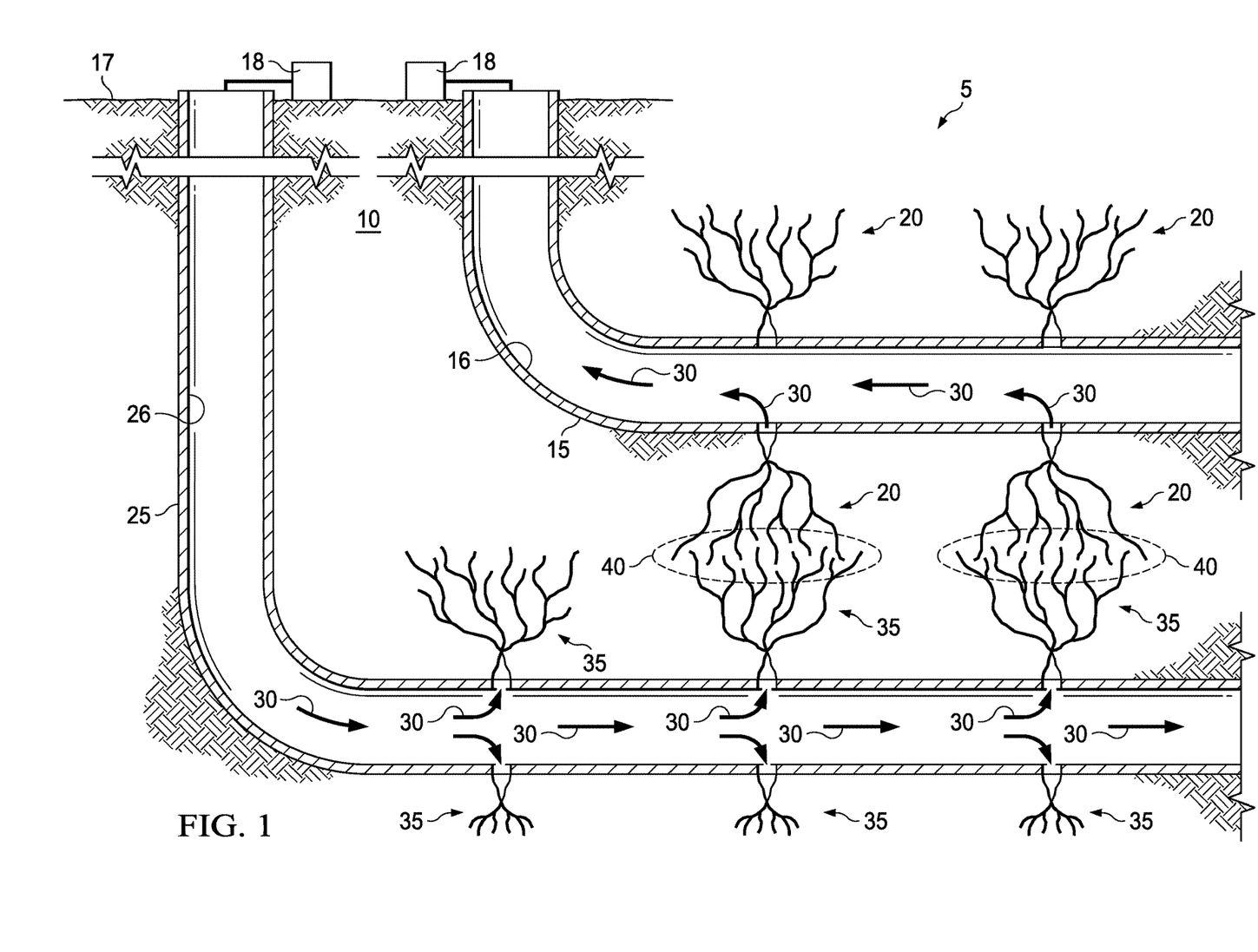
FIG. 1 illustrates an example of a cross-section of a multi-lateral well system in a subterranean formation.

FIG. 1 illustrates a cross-section of a multi-lateral well system, generally 5, in a subterranean formation 10. The first well 15 is illustrated as comprising a production string 16 disposed within and descending from the surface 17 into the first well 15. A pump and mixer system 18 is coupled to production string 16 to pump treatment fluids into the first well 15. The production string 16 may include coiled tubing, jointed pipe, and/or other structures configured to convey a treatment fluid into first well 15. The production string 16 may include flow control devices, bypass valves, fracturing tools, ports, and/or other tools or well devices that are capable of controlling the flow of a treatment fluid from the interior of the production string 16 into the subterranean formation 10.

In the illustrated example, the first well 15 has been drilled and stimulated to produce multiple first fracture networks, generally 20. Second well 25, has also been drilled. Second well 25 may be drilled prior to, subsequent to, or at the same time as first well 15. The terms "first" and "second" are merely used to distinguish wells from one another and do not imply any order of creation. The second well 25 is illustrated as comprising a work string 26 disposed within and descending from the surface 17 into the second well 25. A pump and mixer system 18 is coupled to work string 26 to pump treatment fluids into the second well 25. The work string 26 may include coiled tubing, jointed pipe, and/or other structures configured to convey a treatment fluid into second well 25. The work string 26 may include flow control devices, bypass valves, fracturing tools, ports, and/or other tools or well devices that are capable of controlling the flow of a treatment fluid from the interior of the work string 26 into the subterranean formation 10. For example, the work string 26 may include fracturing tools (not illustrated for clarity of illustration) which comprise ports adjacent to a wall of the second well 25 to apply a treatment fluid directly onto the desired area of subterranean formation 10. The work string 26 may also include ports that are spaced apart from the wall of the second well 25 to convey a treatment fluid into an annulus in the second well 25 between the work string 26 and the wall of the second well 25.

In the illustrated example, a stimulation treatment fluid 30 as represented by the arrows, may be introduced into second well 25 at a fracture gradient above the fracture pressure of subterranean formation 10 to create or enhance one or more second fracture networks, generally 35. An example of stimulation treatment fluid 30 is a pad fluid. If a first fracture network 20 is formed sufficiently close to a second fracture network 35, fluid communicating flow paths may be formed in the far field region 40 of the first fracture network 20 and the second fracture network 35 such that there is fluid flow between the first fracture network 20 and the second fracture network 35. The far field region 40 of a fracture network, is the region of the fracture network farthest from the wellbore from which the fracture network was formed and also the region closest to any other nearby wellbores. In areas of subterranean formation 10 where fluid communicating flow paths may be formed between a first fracture network 20 and a second fracture network 35, the far field region 40 of the first fracture network 20 and the second fracture network 35 would overlap as illustrated in FIG. 1. If fluid communicating flow paths are formed between the first fracture network 20 and the second fracture network 35, the stimulation treatment fluid 30 may enter a first fracture network 20 from a second fracture network 35 through the fluid communicating flow paths. The stimulation treatment fluid 30 may then be produced in the first well 15 as illustrated by the arrows. Production of the stimulation treatment fluid 30 in the first well 15 may result in a reduction in the production of hydrocarbons in the first well 15. Further, stimulation of the second well 25 may require additional volumes of stimulation treatment fluid 30 to stimulate second well 25 successfully.

Figure 2:
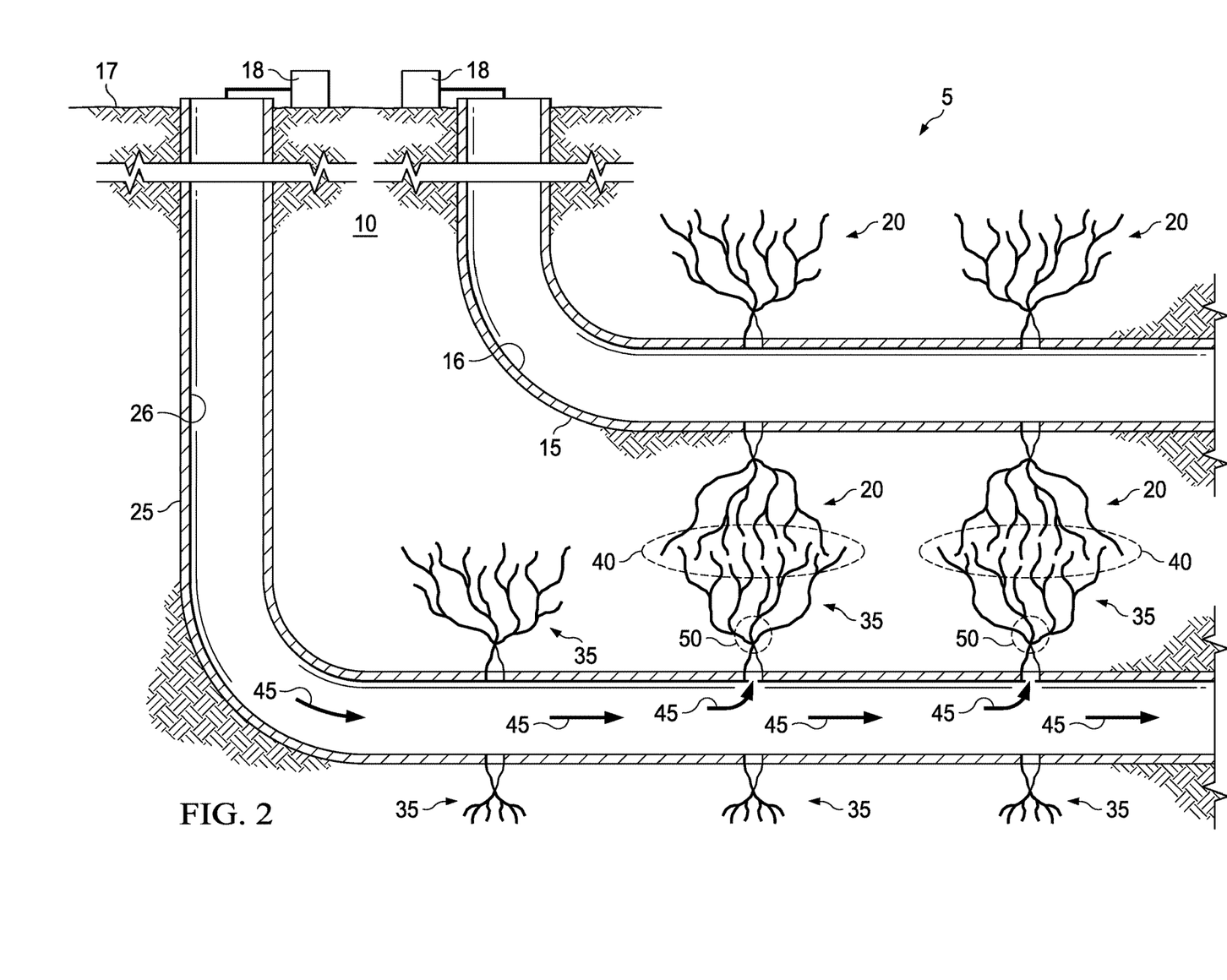
FIG. 2 illustrates another example of a cross-section of a multi-lateral well system in a subterranean formation.

FIG. 2 illustrates a cross-section of a multi-lateral well system, generally 5, in a subterranean formation 10. As in FIG. 1, a first well 15 has been drilled and stimulated to produce multiple first fracture networks, generally 20. Second well 25, has also been drilled. In the example of FIG. 2, a pre-stimulation treatment fluid 45 comprising synthetic clay, may be selectively introduced into second fracture networks 35 as represented by the arrows. An example of a pre-stimulation treatment fluid 45 is a pre-pad fluid. The synthetic clay may be selectively deposited in the near wellbore region 50 of the second fracture networks 35, as illustrated. Deposition of the synthetic clay in the near wellbore region 50 may comprise deposition of the synthetic clay into the primary fracture or into the adjacent secondary fractures of the second fracture network.

Figure 3:
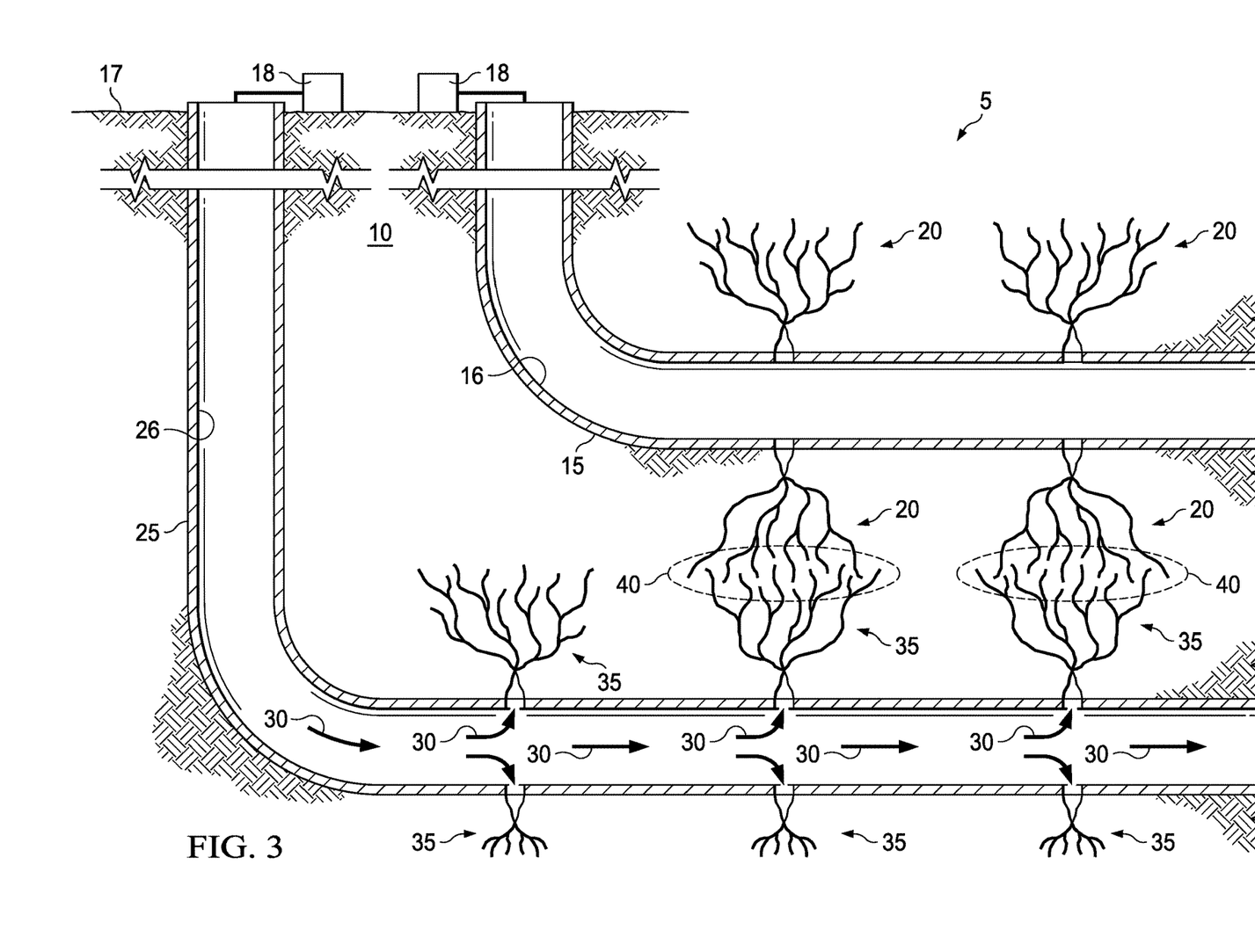
FIG. 3 illustrates another example of a cross-section of a multi-lateral well system in a subterranean formation.

Now referring to FIG. 3, which illustrates a continuation of the method illustrated in FIG. 2, a stimulation treatment fluid 30, as generally represented by the arrows, may be introduced into second well 25 at a fracture gradient above the fracture pressure of subterranean formation 10 to create or enhance one or more second fracture networks 35. The stimulation treatment fluid 30 may displace the synthetic clay out of the near wellbore region 50 of the second fracture networks 35 as illustrated in FIG. 2, and into the far field region 40 of second fracture networks 35 in which fluid communicating flow paths may exist. If the fluid communicating flow paths do exist, the stimulation treatment fluid 30 may also displace the synthetic clay into the far field region 40 of the first fracture networks 20, such that the synthetic clay is placed into the fractures in the far field region 40 of a first fracture network 20 via introduction into a second fracture network 35 formed via the second well 25. Once placed, the synthetic clay may swell and increase in viscosity. The synthetic clay placed in the second fracture network 35 and/or the first fracture network 20 may reduce and prevent fluid communication between first well 15 and second well 25. The synthetic clay may also prevent new fluid communication from occurring by restricting the expansion of fractures in the far field region 40 such that new flow paths between the first well 15 and the second well 25 are not formed. As such, stimulation treatment fluid 30 may not be produced in first well 15 as was illustrated in FIG. 1.

For this specific example, as the synthetic clay was first deposited into the second fracture network 35 via the pre-stimulation treatment fluid 45, the stimulation treatment fluid 30 may not comprise synthetic clay. As such, stimulation treatment fluid 30, may be used in the example method illustrated by FIGS. 2 and 3 without a risk of negatively impacting fluid viscosity by the inclusion of synthetic clay, as the stimulation treatment fluid 30 is not used to convey the synthetic clay to the second fracture network 35 but to displace the synthetic clay into the far field region 40 of the second fracture network 35. In examples where the stimulation treatment fluid 30 may not be negatively impacted by the inclusion of synthetic clay, the stimulation treatment fluid 30 may also be used to convey synthetic clay to a fracture network. The synthetic clay is shear-thinning as discussed above, so it may generally be included in low viscosity stimulation treatment fluids without the risk of negatively impacting the low viscosity stimulation treatment fluids provided shear strain is sufficient.

With continued reference to FIG. 3, and as discussed above, alternatively, the synthetic clay may also be injected with the stimulation treatment fluid 30, for example, a pad fluid, if desired. In this example, a pre-stimulation treatment fluid 45 comprising the synthetic clay may be used, or alternatively, may not be used. In examples, where the pre-stimulation treatment fluid 45 is not used, the stimulation treatment fluid 30 may be the sole source of synthetic clay. In this specific example, the stimulation treatment fluid 30 may deposit the synthetic clay in the far field region 55 of the second fracture networks 35 of a second well 25 as the stimulation treatment fluid 30 creates or enhances one or more fractures within the subterranean formation 10. In other examples, additional synthetic clay may be introduced with a propping fluid used to prop the fractures within a second fracture network 35. The propping fluid may be used after the stimulation treatment fluid 30. In this specific example, the synthetic clay may be deposited into the same fractures of the second fracture network 35 in which the proppant is deposited. In some examples, the propping fluid comprising the synthetic clay may be the sole source of synthetic clay. In alternative examples, a propping fluid comprising synthetic clay may be used in addition to one or more treatment fluids comprising synthetic clay including stimulation treatment fluid 30 and pre-stimulation treatment fluid 45.

Figure 4:
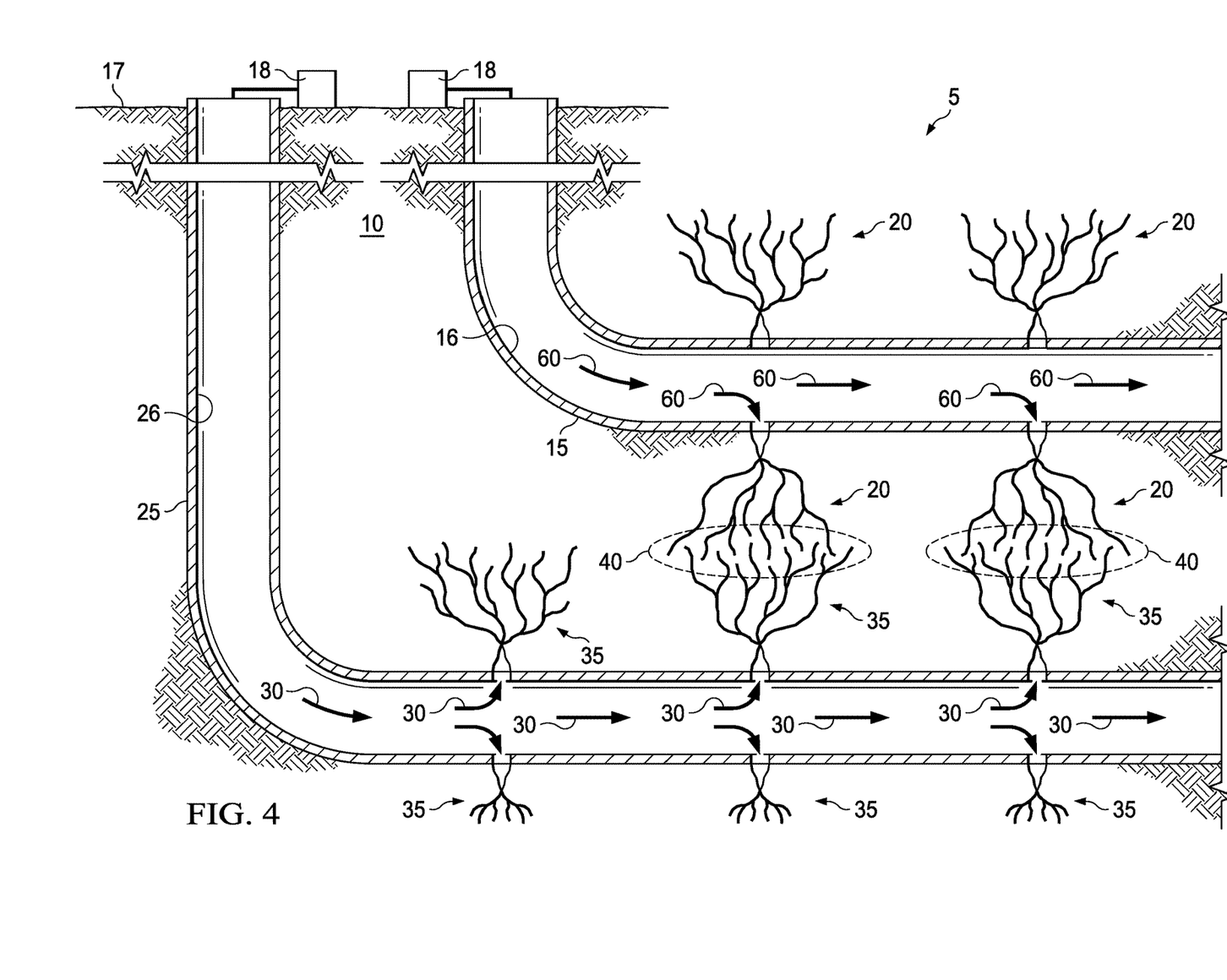
FIG. 4 illustrates another example of a cross-section of a multi-lateral well system in a subterranean formation.

With reference to FIG. 4, the example illustrates a cross-section of a multi-lateral well system, generally 5, in a subterranean formation 10. In this example, first well 15 is a producing well. As a remedial measure, production in first well 15 may be temporarily halted to selectively introduce remedial treatment fluid 60 comprising synthetic clay into the first fracture networks 20. Remedial treatment fluid 60 may be introduced into the first fracture networks 20 at a pressure sufficient to place the synthetic clay into the far field region 40 of first well 15 where fluid communicating flow paths may be formed in a second well 25, when second well 25 is stimulated with a stimulation treatment fluid 30 injected at a pressure above the fracture gradient of subterranean formation 10 to create or enhance one or more fractures in second fracture networks 35. The synthetic clay may swell after placement. In the example, the stimulation treatment fluid 30 may encounter the placed synthetic clay in the far field region 40 of first fracture networks 20 should a fluid communicating flow path form between the second fracture network 35 and first fracture network 20 in the far field region 40 when the second well 25 is stimulated. As such, the synthetic clay may prevent fluid communication between the second fracture network 35 and first fracture network 20. Production may continue in first well 15 with a reduced risk of producing stimulation treatment fluid 30 in first well 15 while second well 25 is stimulated. In further examples, multiple remedial treatment fluids comprising the synthetic clay may be deployed as desired. In alternative examples, the synthetic clay may be used in a remedial treatment fluid 60 to prevent or reduce fluid communication between producing wells. When there is fluid communication between producing wells, the fluid used to displace the hydrocarbons may take the path of least flow resistance and may bypass reserves in low permeability areas and instead flow into another producing well leading to a loss in production in both producing wells. In these examples, the synthetic clay may prevent or reduce fluid communication by partially or completely blocking the fluid communicating flow paths in the fracture networks of the corresponding producing wells.

With reference to FIGS. 1-4, multi-lateral well system 5 may be used in cased or uncased wells as desired and as required by the situation.

With reference to FIGS. 1-4, and as discussed above, a gelling agent may optionally be used with any of the pre-stimulation treatment fluids 45, the stimulation treatment fluids 30, the propping fluids, and/or the remedial treatment fluids 60. The gelling agent may be used to add additional viscosity to the placed synthetic clay if desired. Further, a crosslinking agent may also optionally be used in any examples comprising a gelling agent.

In examples where a propping fluid is used to convey the synthetic clay, the propping fluid comprises proppant particulates. The proppant particulates may include naturally-occurring particles such as sand grains or man-made particles such as resin-coated sand or ceramics. Suitable proppant particulates include, but are not limited to, sand, natural sand, quartz sand, bauxite and other ore, ceramic materials, glass materials, particulate garnet, metal particulates, nylon pellets, polymer materials, polytetrafluoroethylene materials, nut shell pieces, seed shell pieces, fruit pit pieces, wood, or combinations thereof. Suitable proppant particulates may also include composite particulates comprising a binder and a filler material wherein suitable filler materials include silica, alumina, fumed carbon, carbon black, graphite, mica, titanium dioxide, meta-silicate, calcium silicate, talc, zirconia, boron, slag, fly ash, hollow glass microspheres, solid glass, or combinations thereof. The proppant particulates may be selected to have one or more properties such as size, sphericity, density, specific gravity, or another property.

As discussed, the proppant particulates may be variously sized. As used herein, the term "fine," when used to describe proppant particulates, for example, fine proppant particulates, refers to proppant particulates having an average particle size distribution in the range of from about 0.1 micrometers ($\mu$m) to about 100 $\mu$m, encompassing any value and subset therebetween, such as about 1 $\mu$m to about 20 $\mu$m, or about 20 $\mu$m to about 40 $\mu$m, or about 40 $\mu$m to about 60 $\mu$m, or about 60 $\mu$m to about 80 $\mu$m, or about 80 $\mu$m to about 100 $\mu$m, encompassing any value and subset therebetween. In some embodiments, the fine proppant particulates have an average particle size distribution in the range of from a lower limit of about 0.1 $\mu$m, 1 $\mu$m, 5 $\mu$m, 10 $\mu$m, 15 $\mu$m, 20 $\mu$m, 25 $\mu$m, 30 $\mu$m, 35 $\mu$m, 40 $\mu$m, 45 $\mu$m, and 50 $\mu$m to a higher limit of about 100 $\mu$m, 95 $\mu$m, 90 $\mu$m, 85 $\mu$m, 80 $\mu$m, 75 $\mu$m, 70 $\mu$m, 65 $\mu$m, 60 $\mu$m, 55 $\mu$m, and 50 $\mu$m, encompassing any value and subset therebetween. As used herein, the term "medium," when used to describe proppant particulates, for example, medium proppant particulates, refers to proppant particulates having an average particle size distribution in the range of from about 100 $\mu$m to about 200 $\mu$m, encompassing any value and subset therebetween, such as about 100 $\mu$m to about 120 $\mu$m, or about 120 $\mu$m to about 140 $\mu$m, or about 140 $\mu$m to about 160 $\mu$m, or about 160 $\mu$m to about 180 $\mu$m, or about 180 $\mu$m to about 200 $\mu$m, encompassing any value and subset therebetween. In some examples, the medium proppant particulates have an average particle size distribution in the range of from a lower limit of about 100 $\mu$m, 105 $\mu$m, 110 $\mu$m, 115 $\mu$m, 120 $\mu$m, 125 $\mu$m, 130 $\mu$m, 135 $\mu$m, 140 $\mu$m, 145 $\mu$m, and 150 $\mu$m to an upper limit of about 200 $\mu$m, 195 $\mu$m, 190 $\mu$m, 185 $\mu$m, 180 $\mu$m, 175 $\mu$m, 170 $\mu$m, 165 $\mu$m, 160 $\mu$m, 155 $\mu$m, and 150 $\mu$m, encompassing any value and subset therebetween. As used herein, the term "coarse," when used to describe proppant particulates, for example, coarse proppant particulates, refers to proppant particulates having an average particle size distribution in the range of from about 200 $\mu$m to about 900 $\mu$m, encompassing any value and subset therebetween, such as about 200 $\mu$m to about 340 $\mu$m, or about 340 $\mu$m to about 480 $\mu$m, or about 480 $\mu$m to about 620 $\mu$m, or about 620 $\mu$m to about 760 $\mu$m, or about 760 $\mu$m to about 900 $\mu$m, encompassing any value and subset therebetween. In some embodiments, the coarse proppant particulates have an average particle size distribution in the range of from a lower limit of about 200 $\mu$m, 250 $\mu$m, 300 $\mu$m, 350 $\mu$m, 400 $\mu$m, 450 $\mu$m, 500 $\mu$m, and 550 $\mu$m to an upper limit of about 900 $\mu$m, 850 $\mu$m, 800 $\mu$m, 750 $\mu$m, 700 $\mu$m, 650 $\mu$m, 600 $\mu$m, and 550 $\mu$m, encompassing any value and subset therebetween. Each of these values is critical to the examples of the present disclosure and may depend on a number of factors including, but not limited to, the type of proppant particulate selected, the type of subterranean formation being treated, the desired complex fracture geometry, and the like. While overlap in these size ranges may be possible, the selection of the sized proppant particulates may be dependent on a number of factors including, but not limited to, the material of the particulates, the shape of the particulates, the type of subterranean formation, the size of the dominate fracture, and the presence of or desire to create a fracture network, and the like.

It is also to be recognized that the disclosed treatment fluids may directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-4.

EXAMPLES

The present disclosure can be better understood by reference to the following examples which are offered by way of illustration. The present disclosure is not limited to the examples given herein.

Example 1

Three samples were prepared to measure the gel viscosity of synthetic clay under specific conditions. A 0.75% solution of synthetic clay was prepared in water. A 1.0% solution of synthetic clay was also prepared in water. A 1.0% solution of synthetic clay with carboxy methylcellulose (referred to herein as "CMC") was also prepared in water. The CMC was prepared at a polymer loading concentration of 40 lb/1000 gal after allowing the CMC to hydrate for fifteen minutes at pH 7. The viscosity of the samples was measured using a FANN® 35 viscometer at a shear rate of 511 $sec^{-1}$. FANN is a registered trademark of Halliburton Energy Services, Inc. of Houston, Tex. The viscosity was measured at the ambient temperature of 73° F. and after heating to 200° F. Table 1 shows the viscosity of the synthetic clay samples in centipoise ("cP"). As illustrated, the synthetic clay remains stable at high temperatures and increases in viscosity at high temperatures. The addition of the anionic gelling agent, CMC, further increases the viscosity.

TABLE 1

| Sample Description | Gel viscosity (511 $s^{-1}$ at 73° F.) | Gel viscosity (511 $s^{-1}$ at 200° F.) |
| --- | --- | --- |
| 0.75% Synthetic Clay | 2 cP | 12 cP |
| 1.0% Synthetic Clay | 4 cP | 17 cP |
| 40 lb/1000 gal CMC + 1% Synthetic Clay | 76 cP | 110 cP |

Example 2

Figure 5:
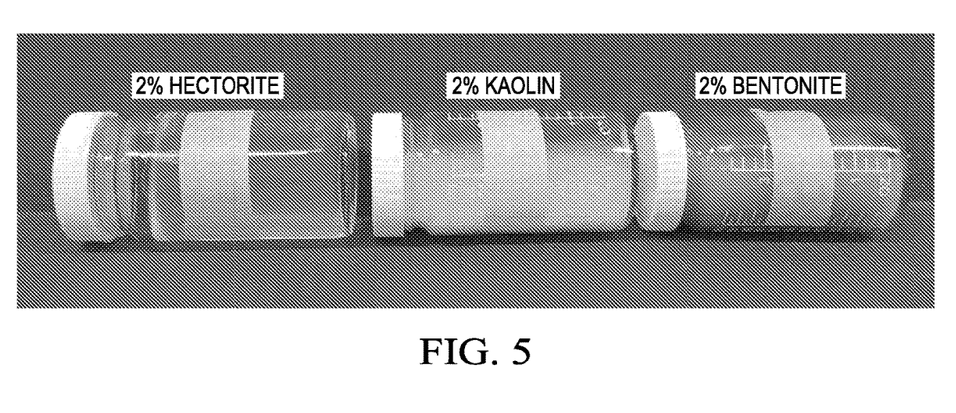
FIG. 5 is a photographic comparison of a synthetic hectorite clay solution, a bentonite clay solution, and a kaolin clay solution illustrating their viscosities.

FIG. 5 is a photograph of a comparative example of a 2.0% synthetic hectorite clay solution in water on the left, a 2.0% kaolin clay solution in water in the center, and a 2.0% bentonite clay solution in water on the right. The photograph illustrates that the synthetic clay sample has gelled when mixed with water and is more viscous than both of the kaolin clay and bentonite clay samples. This is evident as the synthetic hectorite clay sample has not flowed into a level horizontal position, but has maintained a semi-solid gel state. As such, the synthetic clay would be expected to restrict fluid flow through a flow path to a greater extent than a comparable kaolin or bentonite sample which are shown to still be flowable.

Figure 6:
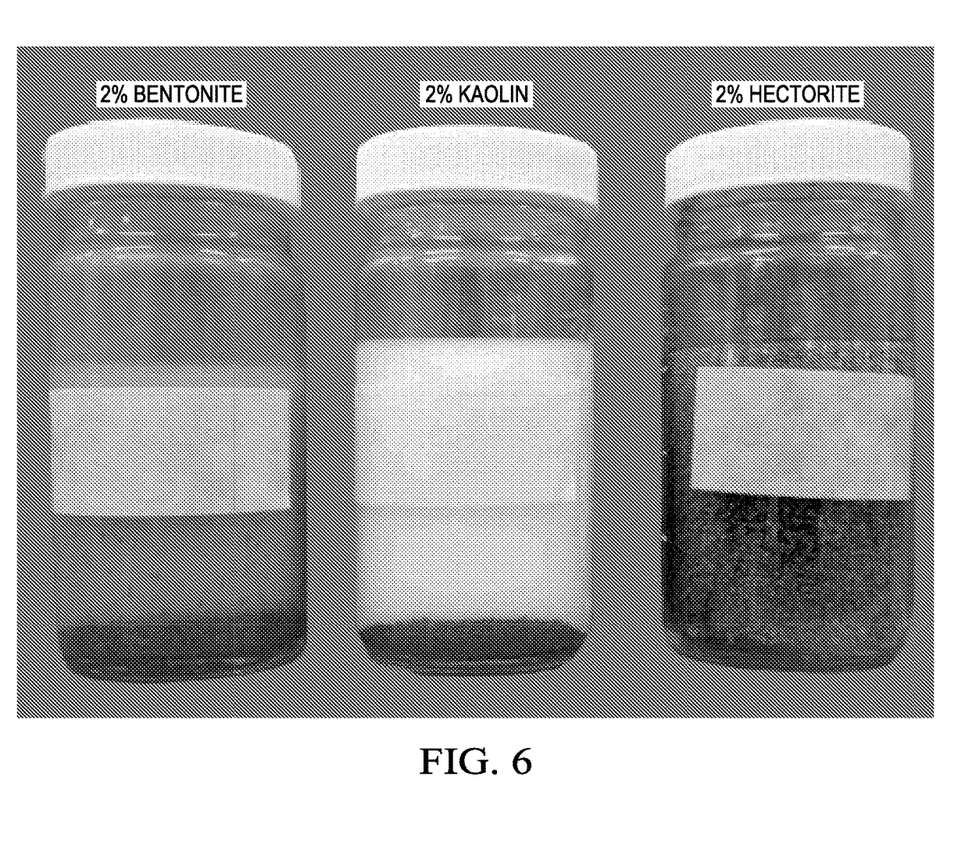
FIG. 6 is a photographic comparison of a synthetic hectorite clay solution, a bentonite clay solution, and a kaolin clay solution illustrating their proppant suspension capabilities.

FIG. 6 is a photograph of a comparative example of a 2.0% synthetic clay solution in water, a 2.0% bentonite clay solution in water, and a 2.0% kaolin clay solution in water. The photograph illustrates that the synthetic clay sample, which would normally be clear, has gelled and suspended a proppant throughout the solution. The bentonite and kaolin samples have not suspended the same proppant to the degree as seen with the synthetic sample.

Provided are methods of reducing fluid communication between wells. An example method comprises providing a first treatment fluid comprising synthetic clay and an aqueous carrier fluid; pumping the first treatment fluid into a first fracture network in fluid communication with a first well; placing the synthetic clay in the first fracture network; pumping a second treatment fluid into the first fracture network after placing the synthetic clay in the first fracture network; wherein the second treatment fluid is not produced in a second well in fluid communication with a second fracture network, and wherein the second fracture network is in fluid communication with the first fracture network. The first treatment fluid may be a pre-pad fluid, a pad fluid, or a propping fluid. A temperature within the first fracture network may be greater than 350° F. The concentration of the synthetic clay in the first treatment fluid may range from about 0.01% (w/v) of the treatment fluid to about 20% (w/v) of the treatment fluid. The first treatment fluid may further comprise a gelling agent selected from the group consisting of carboxyethyl cellulose, carboxymethyl cellulose, carboxymethylhydroxyethyl cellulose, hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose, guar, guar derivatives, xanthum, and combinations thereof. The concentration of the gelling agent in the first treatment fluid may range from about 0.1% (w/v) to about 3% (w/v) of the treatment fluid. The second treatment fluid may comprise synthetic clay. The first treatment fluid may be a pre-pad fluid and the second treatment fluid may be a pad fluid. The first treatment fluid may be a pad fluid and the second treatment fluid may be a subsequent pad fluid which does not comprise synthetic clay.

Provided are method of reducing fluid communication between wells. An example method comprises providing a first treatment fluid comprising synthetic clay and an aqueous carrier fluid; pumping the first treatment fluid into a first fracture network in fluid communication with a first well; placing the synthetic clay in the first fracture network; pumping a second treatment fluid into a second fracture network in fluid communication with a second well; wherein the second treatment fluid is not produced in the first well, and wherein the second fracture network is in fluid communication with the first fracture network. The first treatment fluid may be a pre-pad fluid, a pad fluid, or a propping fluid. The second treatment fluid may be a pre-pad fluid, a pad fluid, or a propping fluid. A temperature within the first fracture network may be greater than 350° F. The concentration of the synthetic clay in the first treatment fluid may range from about 0.01% (w/v) of the treatment fluid to about 20% (w/v) of the treatment fluid. The first treatment fluid may further comprise a gelling agent selected from the group consisting of carboxyethyl cellulose, carboxymethyl cellulose, carboxymethylhydroxyethyl cellulose, hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose, guar, guar derivatives, xanthum, and combinations thereof. The concentration of the gelling agent in the first treatment fluid may range from about 0.1% (w/v) to about 3% (w/v) of the treatment fluid. The second treatment fluid may comprise synthetic clay. The first treatment fluid may be a pad fluid and the second treatment fluid may be a subsequent pad fluid which does not comprise synthetic clay.

Provided are systems for reducing fluid communication between wells. An example system comprises a first treatment fluid comprising synthetic clay and an aqueous carrier fluid; a first well in fluid communication with a first fracture network; a second well in fluid communication with a second fracture network; a pump and mixer system capable of pumping the first treatment fluid into the first fracture network or the second fracture network; and wherein the first fracture network and the second fracture network are in fluid communication. The first treatment fluid may be a pre-pad fluid, a pad fluid, or a propping fluid. A temperature within the first fracture network may be greater than 350° F. The concentration of the synthetic clay in the first treatment fluid may range from about 0.01% (w/v) of the treatment fluid to about 20% (w/v) of the treatment fluid. The first treatment fluid may further comprise a gelling agent selected from the group consisting of carboxyethyl cellulose, carboxymethyl cellulose, carboxymethylhydroxyethyl cellulose, hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose, guar, guar derivatives, xanthum, and combinations thereof. The concentration of the gelling agent in the first treatment fluid may range from about 0.1% (w/v) to about 3% (w/v) of the treatment fluid. The system may further comprise a second treatment fluid. The second treatment fluid may comprise synthetic clay. The first treatment fluid may be a pre-pad fluid and the second treatment fluid may be a pad fluid. The first treatment fluid may be a pad fluid and the second treatment fluid may be a subsequent pad fluid which does not comprise synthetic clay.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of reducing fluid communication between wells:
    providing a first treatment fluid comprising synthetic clay and an aqueous carrier fluid; wherein the first treatment fluid does not comprise a gelling agent and viscosifying additive;
    pumping the first treatment fluid into a first fracture network in fluid communication with a first well; wherein the first fracture network is in a subterranean formation and wherein the first treatment fluid is a pad fluid pumped into the first fracture network at a pressure exceeding the fracture gradient of the subterranean formation;
    placing the synthetic clay in the first fracture network;
    pumping a second treatment fluid into the first fracture network after placing the synthetic clay in the first fracture network; wherein the first fracture network is in fluid communication with a second fracture network; wherein the second fracture network is in fluid communication with a second well;
    depositing the synthetic clay in a flow path between the first fracture network and the second fracture network; wherein the synthetic clay swells in the flow path between the first fracture network and the second fracture network as shear is reduced;
    wherein the second treatment fluid is not produced in the second well after pumping the second treatment fluid into the first fracture network.

2. The method of claim 1, wherein a temperature within the first fracture network is greater than 350° F.

3. The method of claim 1, wherein the concentration of the synthetic clay in the first treatment fluid ranges from about 0.01% (w/v) of the first treatment fluid to about 20% (w/v) of the first treatment fluid.

4. The method of claim 1, wherein the second treatment fluid comprises synthetic clay.

5. The method of claim 1, further comprising a pre-pad fluid introduced prior to the first treatment fluid.

6. The method of claim 1, wherein the second treatment fluid is a subsequent pad fluid which does not comprise synthetic clay.

7. A method of reducing fluid communication between wells:
    providing a first treatment fluid comprising synthetic clay and an aqueous carrier fluid; wherein the first treatment fluid does not comprise a gelling agent F and viscosifying additive;
    pumping the first treatment fluid into a first fracture network in fluid communication with a first well; wherein the first fracture network is in a subterranean formation and wherein the first treatment fluid is a pad fluid pumped into the first fracture network at a pressure exceeding the fracture gradient of the subterranean formation;

placing the synthetic clay in the first fracture network; wherein the first fracture network is in fluid communication with a second fracture network; wherein the second fracture network is in fluid communication with a second well;

depositing the synthetic clay in a flow path between the first fracture network and the second fracture network; wherein the synthetic clay swells in the flow path between the first fracture network and the second fracture network as shear is reduced;

pumping a second treatment fluid into the second fracture network in fluid communication with the second well;

wherein the second treatment fluid is not produced in the first well after pumping the second treatment fluid into the second fracture network.

8. The method of claim 7, wherein a temperature within the first fracture network is greater than 350° F.

9. The method of claim 7, wherein the concentration of the synthetic clay in the first treatment fluid ranges from about 0.01% (w/v) of the s treatment fluid to about 20% (w/v) of the first treatment fluid.

10. The method of claim 7, wherein the second treatment fluid comprises synthetic clay.

\* \* \* \* \*